(12) United States Patent  
Geroux et al.

(10) Patent No.: US 7,510,164 B2
(45) Date of Patent: Mar. 31, 2009

(54) SUPPORT EQUIPPED WITH VIBRATION-ABSORBING MEANS FOR A BLOWER MOTOR

(75) Inventors: Pierre Arnaud Geroux, Chatou (FR); Stephane Talaucher, Bonnelles (FR)

(73) Assignee: Valeo Climatisation S.A., LaVerriere (FR)

( * ) Notice: Subject to any disclaimer, the term of this patent is extended or adjusted under 35 U.S.C. 154(b) by 436 days.

(21) Appl. No.: 11/194,838

(22) Filed: Aug. 1, 2005

(65) Prior Publication Data

US 2006/0038106 A1 Feb. 23, 2006

(30) Foreign Application Priority Data

Aug. 17, 2004 (FR) .................... 04 08924

(51) Int. Cl.
   F16M 1/00 (2006.01)
   F16M 3/00 (2006.01)
   F16M 5/00 (2006.01)
   F16M 7/00 (2006.01)
   F16M 9/00 (2006.01)
   F16M 11/00 (2006.01)

(52) U.S. Cl. ............... 248/638; 248/560; 248/569; 248/603; 248/605; 248/636; 248/562; 267/140.5; 267/141; 267/141.2

(58) Field of Classification Search ............ 248/560, 248/562, 569, 603, 605, 636, 638; 267/140.5, 267/141, 141.2
See application file for complete search history.

(56) References Cited

U.S. PATENT DOCUMENTS

| 5,533,704 | A | 7/1996 | Fischinger et al. |
| 6,045,112 | A * | 4/2000 | Kirkwood .................. 248/634 |
| 6,278,209 | B1 * | 8/2001 | Rupp et al. .................. 310/91 |
| 6,505,807 | B1 | 1/2003 | Nolting et al. |
| 6,717,299 | B2 * | 4/2004 | Bacile et al. ................. 310/51 |
| 6,897,580 | B2 * | 5/2005 | White ........................ 310/51 |
| 2004/0169118 | A1 * | 9/2004 | Talaucher et al. ........... 248/314 |

FOREIGN PATENT DOCUMENTS

| DE | 197 12 228 | 10/1998 |
| EP | 0 800 000 A | 10/1997 |
| EP | 1 107 432 A | 6/2001 |
| EP | 0 800 000 B | 8/2003 |

* cited by examiner

Primary Examiner—J. Allen Shriver, II
Assistant Examiner—Nkeisha J Dumas
(74) Attorney, Agent, or Firm—Howard & Howard Attorneys PLLC

(57) ABSTRACT

A support (10) for a motor, particularly for a motor vehicle heating, ventilation and/or air-conditioning unit blower, includes a more or less cylindrical hollow sleeve (20) intended to accept the motor, and a fixing housing (30) intended to accept the hollow sleeve (20). The support (10) also includes insulating pads (40) and longitudinal strands (60) for absorbing vibrations.

20 Claims, 7 Drawing Sheets

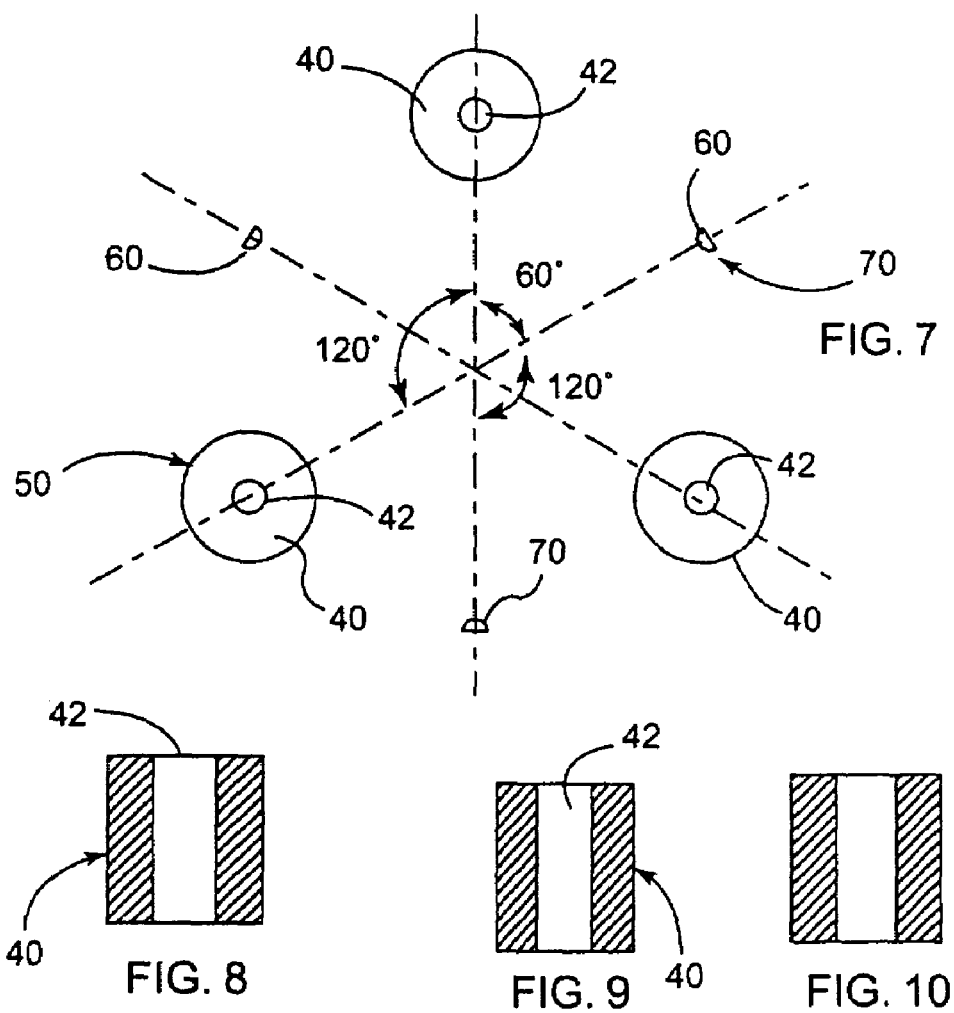
FIG. 7
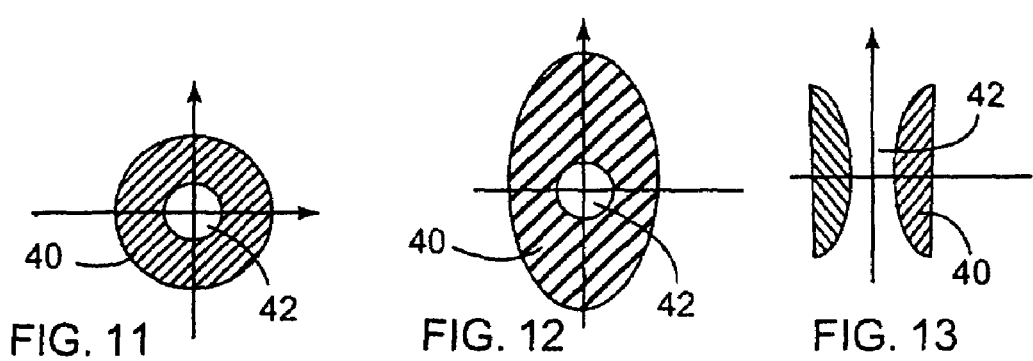
FIG. 8　　FIG. 9　　FIG. 10
FIG. 11　　FIG. 12　　FIG. 13

SUPPORT EQUIPPED WITH VIBRATION-ABSORBING MEANS FOR A BLOWER MOTOR

BACKGROUND OF THE INVENTION

The invention relates to a support equipped with vibration-absorbing means for a motor, particularly a motor vehicle heating, ventilation and/or air-conditioning unit blower.

In present-day vehicles, the heating, ventilation and/or air-conditioning unit comprises, in a known and customary manner, a bladed blower equipped with a rotary motor mounted on a support. Now, because of the rotation of the drive shaft of the blower driving the air-propelling blades, vibrations may be produced at various frequencies according to the rotational speed of said shaft, according to its imbalance and according to the noise emitted directly by said motor. These noises and vibrations may thus be transmitted to other parts of the heating, ventilation and/or air-conditioning unit, particularly to the dashboard, which may itself disseminate them to the ventilation openings, to fasteners such as clips, mounting rings, screws, or to moving parts such as glove box doors, etc.

Such vibrations may be particularly troublesome both from an acoustic point of view, in terms of the comfort of the passengers of the vehicle, and in terms of the wear of the components that begin to vibrate and deteriorate or alternatively run the risk of becoming detached.

DESCRIPTION OF THE PRIOR ART

Means have been developed in the past to remedy this disadvantage, such as those described in patent document EP-B-800 000. Thus, in order to avoid the propagation of the vibrations produced by the motor to the motor support, provision is made for said motor to be acoustically insulated using pads in a material of the rubber type. The disadvantage of these means lies in the fact that they are unable to absorb all the vibrations produced by the motor, that is to say a whole range of frequencies of vibration.

This is because the out-of-balance or the imbalance of the motor creates vibrations at frequencies of between 0 and 50 Hz when the shaft is rotating at a speed of between about 0 and 3000 revolutions/min.

Furthermore, the harmonics created by the motor torque operate at a frequency of between about 160 and 4000 Hz.

In addition, rattling noises are created as the contact brushes rub against the electrical power supply tracks of the motor at frequencies of between 2000 and 8000 Hz.

One object of the present invention is thus to minimize and, for preference, to eliminate, these vibrations so as to prevent them from propagating from the motor to its support.

Thus, the devices of the prior art are unable to correctly decouple the motor from its support, to reduce the transmission of the vibrations caused by the imbalance of the motor, and to resist external knocks. Because of the configuration of these devices for processing vibrations by decoupling, the insulation cannot be effected correctly because the constraints pull in different directions. Choosing the material used for the insulator also poses problems because it requires both a certain rigidity in order to withstand external vibrations and to avoid amplifying the imbalance of the motor, and a certain degree of softness in order to reduce the transmission of noise.

Furthermore, the devices of the prior art are lacking in reliability over time, particularly as a function of the climatic and mechanical conditions surrounding the motor. It would therefore be appropriate, right from the design phase, to anticipate a massive reduction in the transmission of vibrations so as to avoid a high component failure rate that is expensive and detracts from the quality of the product. In addition, the devices wear rapidly, the absorption of vibrations diminishes, thus increasing the discomfort of the passengers and the risk of component destruction.

Finally, the removal of the motor for repair or replacement is tricky and complicated to perform.

SUMMARY OF THE INVENTION

In order to solve these problems, the present invention proposes to integrate the vibration-absorption means into the support.

More specifically, the invention relates to a support for a motor, particularly a motor vehicle heating, ventilation and/or air-conditioning unit blower, the motor having an axis of revolution and the support comprising a more or less cylindrical hollow sleeve intended to accept the motor, a fixing housing intended to accept the hollow sleeve, and vibration-absorbing means, in which said vibration-absorbing means are overmolded onto the fixing housing, so as to collaborate with the sleeve.

According to some preferred embodiments of the present invention:

- the sleeve is equipped with at least one guide finger,
- the vibration-absorbing means comprise at least one pad collaborating with the guide finger,
- each pad is in the shape of a cylinder and has a central through-orifice into which the guide finger of the sleeve fits,
- each pad measures more or less 4 to 10 mm in axial height, and has a radial thickness of material of at least two mm around the orifice,
- the insulating pads are three in number,
- the vibration-absorbing means additionally comprise at least one longitudinal strand collaborating with an external wall of the sleeve,
- the longitudinal strand is secured to an internal wall of the fixing support and is in contact with the external wall of the sleeve,
- the longitudinal strands are three in number,
- each strand has an axial length of at least 20 mm, and a radial thickness of at least 1 mm,
- the insulating pads and the strands alternate with and are angularly offset by about 60° with respect to one another,
- the pads and/or the strands are overmolded as a single piece onto the fixing housing,
- the vibration-absorbing means are based on an elastically deformable material such as an elastomer, and
- the material is made of a thermoplastic elastomer having a Shore hardness of between about 20 and 30, ideally of 25.

BRIEF DESCRIPTION OF THE DRAWINGS

Other features, details and advantages of the invention will become apparent from reading the description which follows, given with reference to the attached drawings provided by way of example and which respectively depict:

FIG. 7: a sectioned view of the means of FIG. 4;

FIGS. 8 to 10: views in longitudinal (i.e. axial) section of the insulating pads; and FIGS. 11 to 13: views in transverse (i.e. radial) cross section of the insulating pads.

DESCRIPTION OF THE PREFERRED EMBODIMENTS

Figure 1:
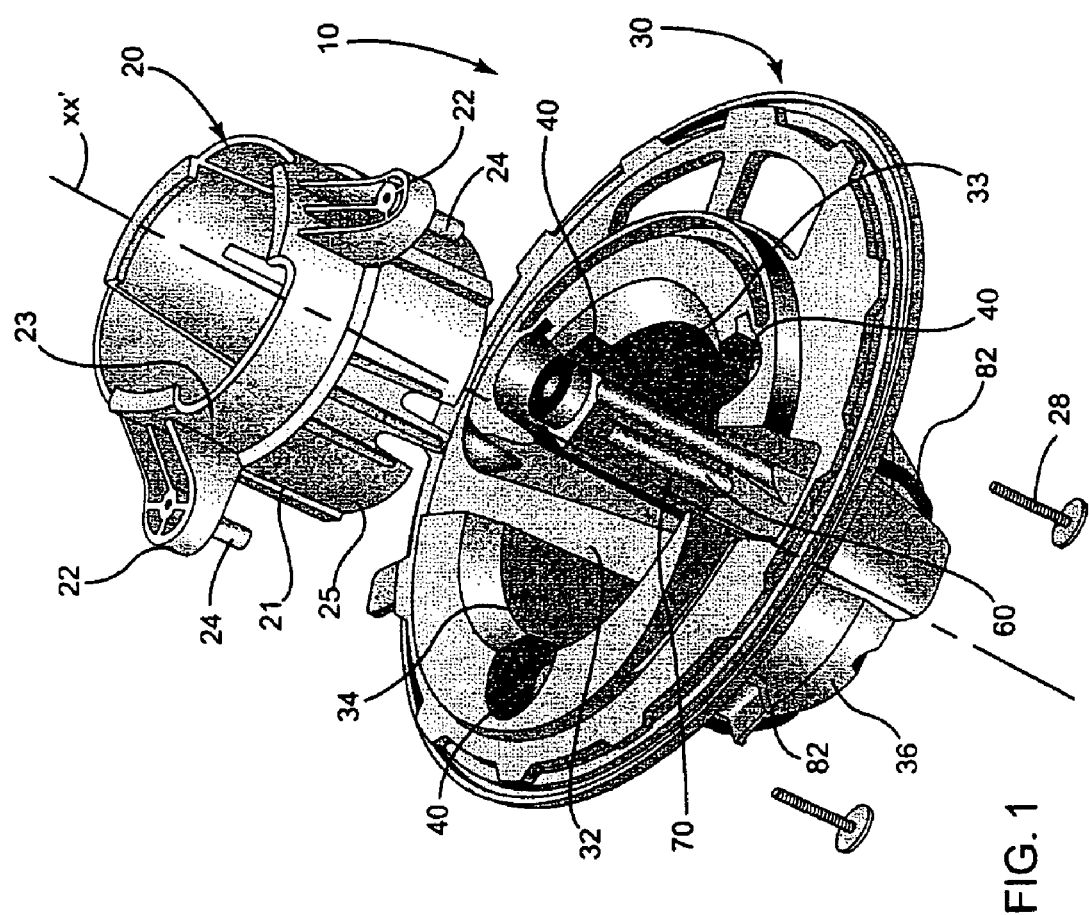
FIGS. 1 and 2: exploded perspective views of a rotary blower motor support according to the present invention.
Figure 2:
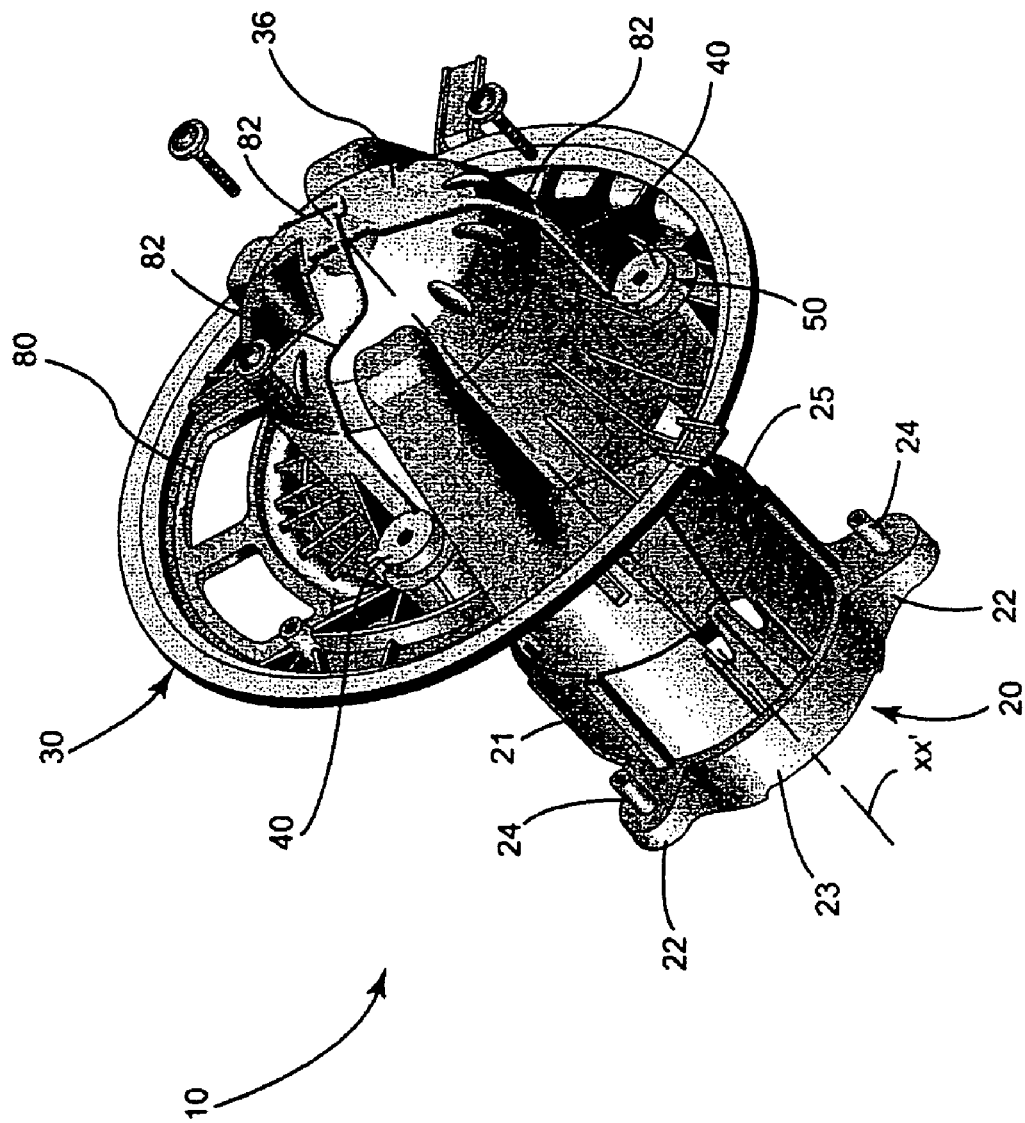
Figure 3:
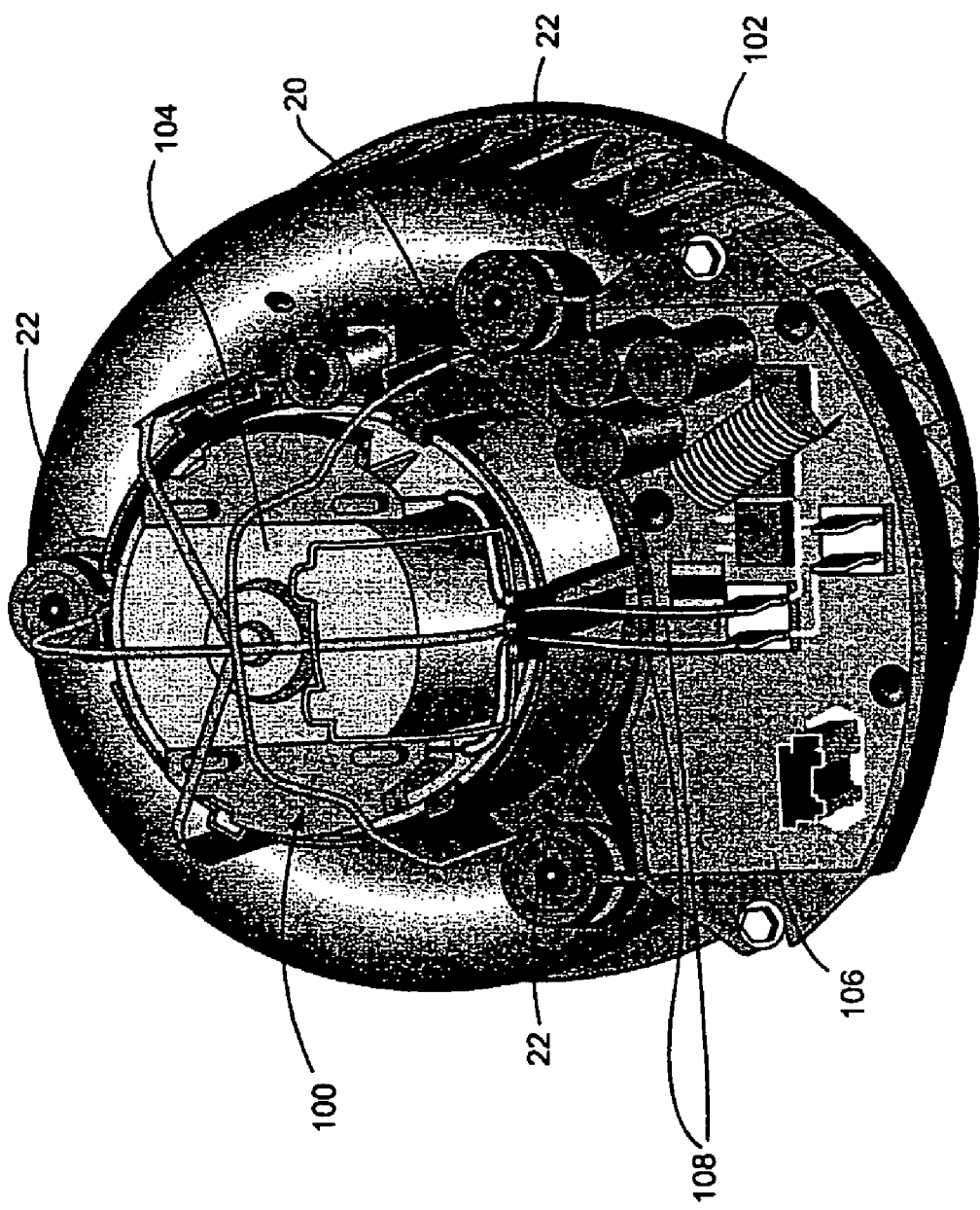
FIG. 3: a perspective view of a blower rotary motor intended to be mounted on the support of the present invention.

FIGS. 1 and 2 each depict an exploded perspective view from a different angle of a support 10 for a rotary motor 100 of a blower with a bladed impeller 102 which is depicted in greater detail in perspective in FIG. 3. This support 10 comprises, according to the preferred embodiment of the present invention, an elongate central sleeve 20 having more or less the shape of a cylinder of revolution of axis of revolution XX' and of more or less circular cross section. This sleeve 20 is designed to internally accept the body 104 of the rotary motor 100 of FIG. 3, and various electrical connections between said motor 100 and external elements, such as an electronic board 106 and an electrical power supply 108.

The sleeve 20, typically produced by molding in rigid plastic, such as polypropylene, is made up of an external wall 21 having an upper ring 23 and a lower ring 25. The sleeve 20 is equipped with three mounting arms 22 extending radially outward from the external wall 21, near the upper ring 23. These three mounting arms 22, which are ribbed in order to improve their rigidity, are each equipped with a guide finger 24, extending axially from the upper ring 23 toward the lower ring 25 of the sleeve 20. These guide fingers 24 have a hollow cylindrical overall shape with a circular internal and external cross section and which are more or less 10 to 15 mm in length, preferably 12.5 mm, and approximately 5 to 7 mm in outside diameter, preferably 6 mm. The three arms 22, and therefore the three guide fingers 24, are arranged on the same circumference, in the same plane and are preferably angularly distributed 120° apart so as to form an equilateral triangle. This configuration makes it possible to improve the stability of the motor 100 and the absorption of the vibrations it produces as it rotates and oscillates about its axis of rotation when the center of gravity of the motor and of its blade coincide with the center of inertia of the triangle formed by the guide fingers 24.

The support 10 of the present invention also comprises a fixing housing 30 of complex shape designed to fit the rotary motor 100 and other complementary elements that may be incorporated into the support 10 or placed around said support 10. The fixing housing 30, typically produced by molding in rigid plastic such as polypropylene, comprises a hollow recess 32 in the form of a barrel exhibiting an internal wall 33, an opening 34 and a closing-off dome 36 at the opposite end to the opening 34. This hollow recess 32, in the shape of a cylinder of circular cross section is intended to accept at least part of the elongate sleeve 20 housing the rotary motor 100.

The fixing housing 30 comprises, at the periphery of the hollow recess 32 and set to slightly lower levels than its opening, three insulating pads 40 forming first vibration-absorbing means 50. These insulating pads 40 are made of a soft and acoustically absorbing rubber such as a thermoplastic elastomer, for example based on EPDM.

The three insulating pads 40 are arranged in the same circumference, in the same plane and are angularly distributed, preferably at 120° from one another so as to form an equilateral triangle as can be seen in FIG. 7. This configuration makes it possible to obtain good isostaticity of the acoustic insulation provided by these insulating pads 40 for the same reasons as those mentioned regarding the guide fingers 24, that is to say when the center of gravity of the motor and of its blade (and also, incidentally, of other fixed elements such as electronic components) coincides with the center of inertia of the triangle formed by the insulating pads 40.

The sleeve 20 is designed to be mounted inside the hollow recess 32 of the housing 30 so that the insulating pads 40 respectively accept the guide fingers 24 of the sleeve 20. Means for axially holding the sleeve 20 on the fixing housing 30 are in the form of three screws 28 entering the guide fingers 24 which have a circular internal cross section.

Once the rotary motor 100 is mounted inside the sleeve 20 and the sleeve 20 is mounted inside the fixing housing 30, as depicted in FIG. 3, the plane in which the three insulating pads 40 lie passes as close as possible to the center of gravity of the assembly formed of the motor 100 and of its bladed impeller 102. This solution makes it possible to reduce the lever arm and imbalance or out-of-balance effect of the motor 100 when the latter oscillates as it rotates.

The insulating pads 40 are overmolded directly onto the body of the fixing housing 30 for reasons of ease of manufacture and improvement of performance of the support in terms of vibration absorption. As a preference, the material used is a thermoplastic elastomer with a Shore hardness of about 25, which allows vibrations that arise between more or less 2 kHz and 10 kHz to be absorbed.

As can be seen in FIGS. 8 to 13, the insulating pads 40 may have different shapes so as to accept the guide fingers 24 of the sleeve 20. In general, each insulating pad 40 has the shape of a cylinder with an either annular cross section with different thicknesses (FIGS. 8, 11 and 13) or a non-circular elliptical cross section of variable thickness (FIGS. 9 and 12) and a straight or hyperbolic internal longitudinal cross section (FIGS. 10 and 13 respectively). Furthermore, the internal cross section of the through-orifice 42 is preferably circular, but may equally be elliptical and non-circular so as to suit guide fingers 24 which themselves have an elliptical circular or otherwise external cross section.

The choice of the radial thickness of the material that forms the insulating pads 40 is guided by the type of absorption desired, particularly the frequency of the vibrations and their direction of propagation. It is appropriate to anticipate a close compromise, in terms of material thickness, so as both to absorb the maximum amount of vibrations and give the motor 100 good stability when it is rotating and oscillating about its center of gravity.

In the embodiment presented, the insulating pads 40 are cylinders of annular cross section measuring more or less at least 8 mm in axial height for a radial thickness of material of about 2 mm minimum.

The fixing housing 30 is also equipped with three longitudinal strands 60 to form second vibration-absorbing means 70. These longitudinal strands 60 are made of a rubbery material such as a thermoplastic elastomer. The three longitudinal strands 60 run axially along the internal wall 33 of the hollow recess 32. The longitudinal strands 60 are thus arranged on a common circumference and are angularly distributed preferably at 120° C. from one another so as to form, when viewed in cross section, an equilateral triangle. This configuration makes it possible to obtain good isostaticity of the acoustic insulation provided by these strands, as with the insulating pads 40.

As visible in particular in FIG. 7, the insulating pads 40 and the longitudinal strands 60 alternate with and are angularly offset by 60° with respect to one another in order to obtain an optimum distribution of the vibration absorption.

Advantageously, the longitudinal strands 60 measure about 20 mm in axial length for a radial thickness of about 1 mm so as more specifically to absorb low frequencies. Once the sleeve 20 is mounted in the housing 30, the external wall 21 of said sleeve 20 presses against the longitudinal strands 60 with zero clearance, possibly even crushing them slightly. It is preferable for the compression ratio of the longitudinal strands 60 to be lower than that of the insulating pads 40 so as not to short-circuit the absorbing effect of the insulating pads 40. As a preference, it is the insulating pads 40 which absorb the vibrations first, followed by the longitudinal strands 60 when the compression of the insulating pads 40 exceeds a certain threshold.

Figure 4:
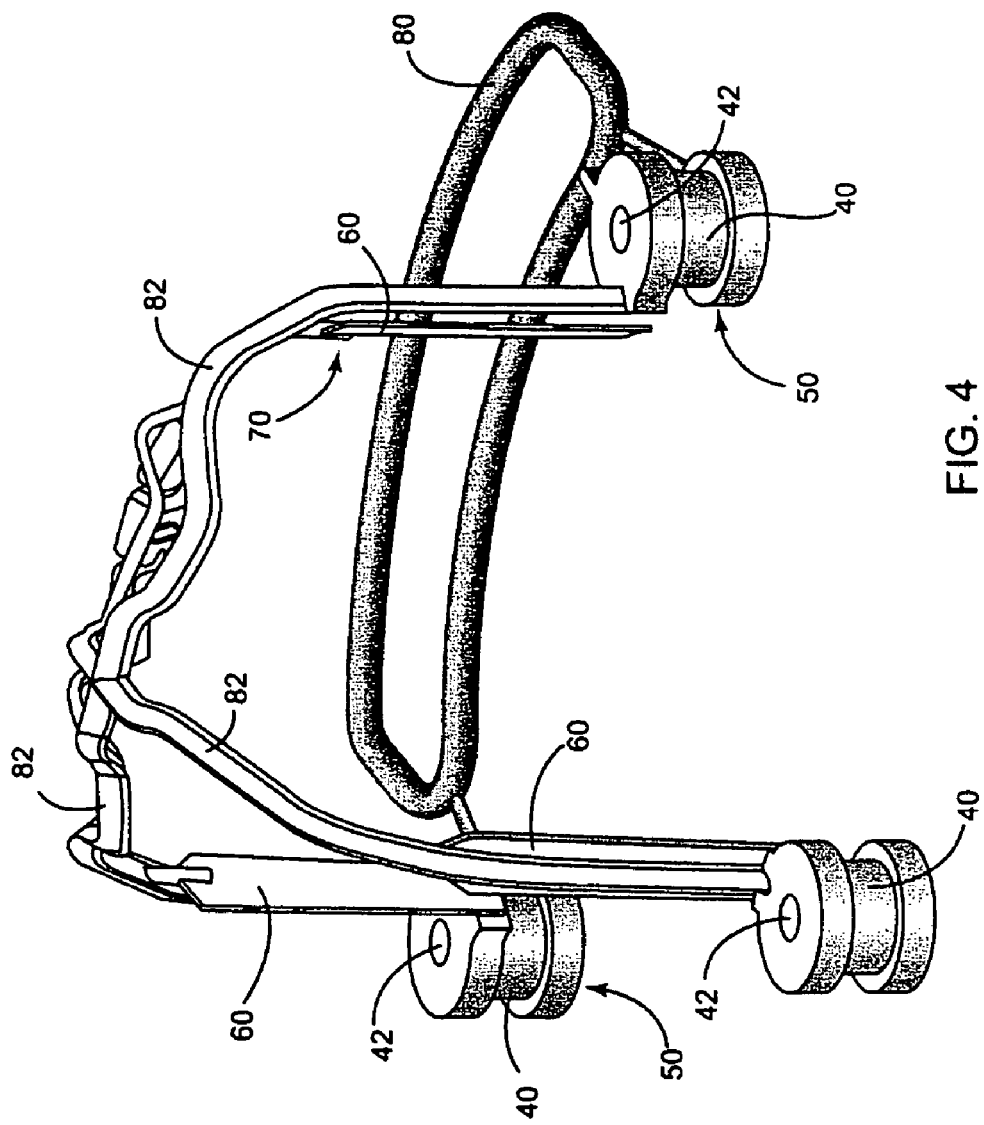
FIG. 4: a perspective detailed view of the vibration-absorbing means with which the support is equipped.
Figure 5:
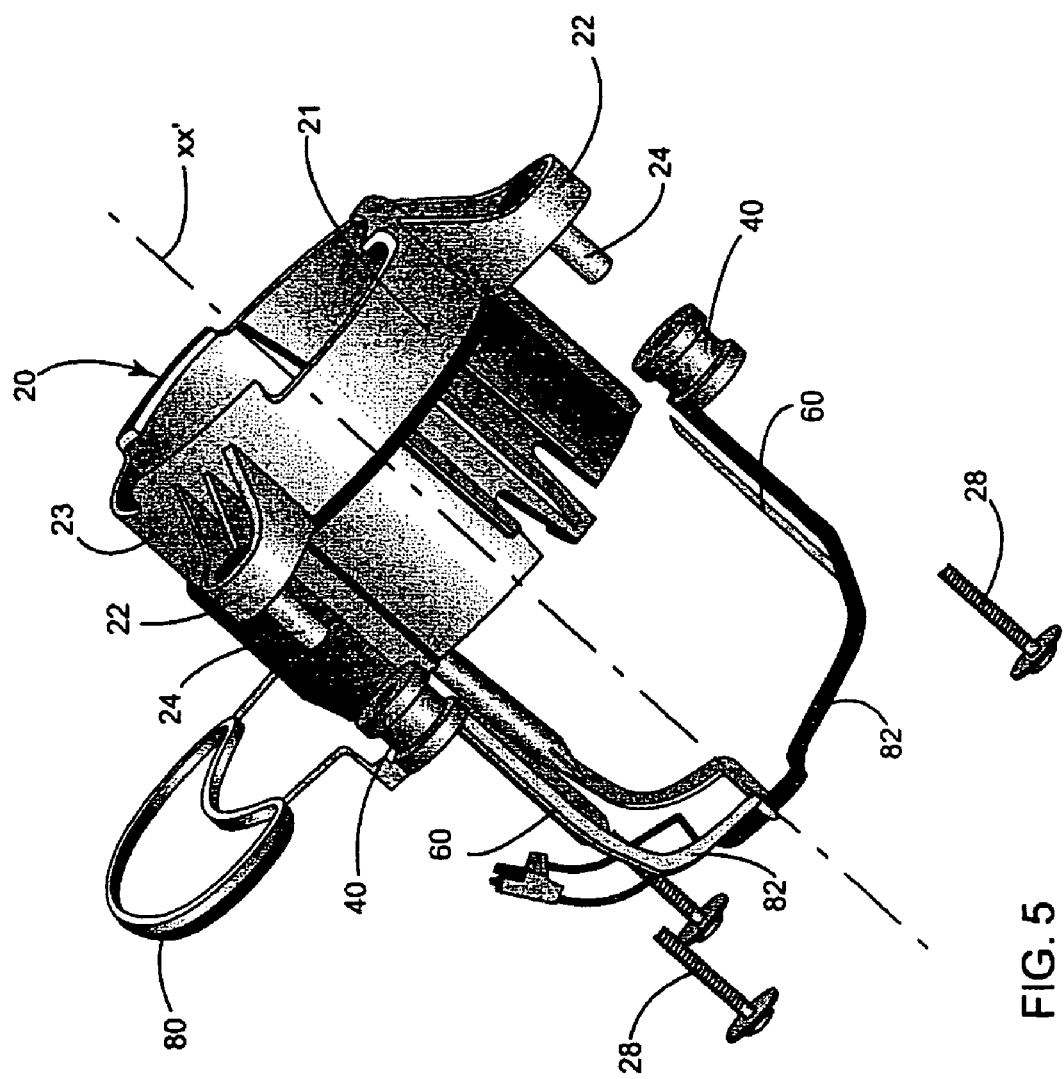
FIG. 5: an exploded perspective view illustrating the collaboration between the vibration-absorbing means and a tubular sleeve of the support.
Figure 6:
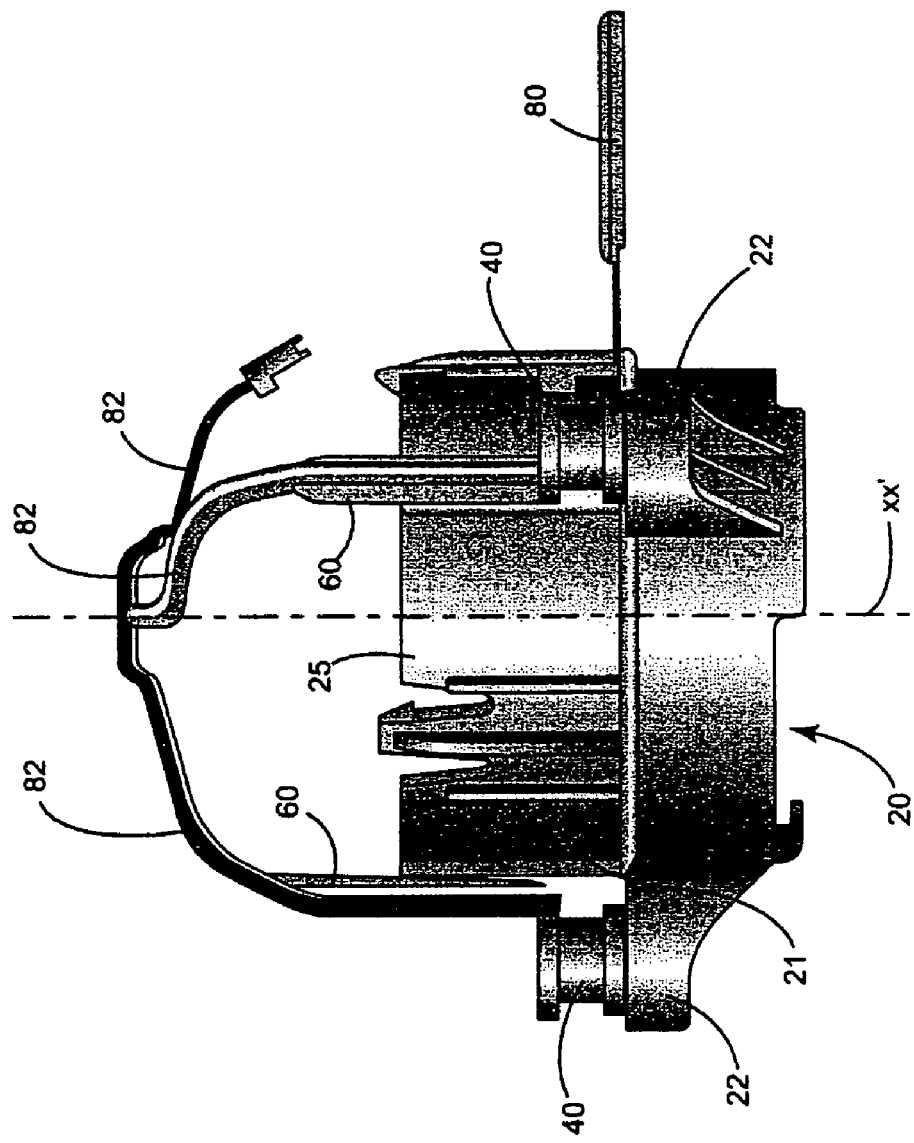
FIG. 6: a side view of the sleeve once it is in contact with the vibration-absorbing means.

As visible in particular in FIGS. 4 and 5, the insulating pads 40 and the longitudinal strands 60 form a unitary assembly overmolded in a single step onto the fixing housing 30. In order for this overmolding operation to be performed easily, connecting strands 80 and 82 connect the pads 40 and/or the longitudinal strands 60 together. Thus, the elastomeric strands 82 connect the longitudinal strands 60 together and appear on the outside of the fixing housing 30, while the elastomeric strand 80 is inserted in a groove of the fixing housing 30 and connects two of the three insulating pads 40 together.

The combination of the three insulating pads 40 and of the three longitudinal strands 60 allows optimum absorption of the vibrations which, without these means 50 and 70 being present, would be propagated from the rotary motor 100 to a dashboard (not depicted). This combination allows decoupling of the various stresses that the support has to withstand in terms of acoustic vibrations. The insulating pads 40 thus make it possible to absorb small torsion deformations and to decouple the rotary motor 100, while the strands 60 act more specifically on large-amplitude radial deformations and make it possible to avoid fatigue in the insulating pads 40, the propagation of low-frequency vibrations in all directions in a torsion mode, and the propagation of low-frequency (0-300 Hz) vibrations in a longitudinal and radial mode. In addition, this combination takes account both of the torsional deformations or vibrations about the three axes, but also takes account of translational deformations along these three axes.

The advantages afforded by the technical solution adopted in the present invention are as follows:

the vibrations are insulated as close as possible to their source;

it is possible at the same time to produce three insulating pads and three longitudinal strands, thus making it possible to obtain a mechanically isostatic embodiment;

the position of the insulating pads and of the longitudinal strands respectively at more or less 120° from one another, and the angular offset by an angle of about 60° between the pads and the strands gives an optimum distribution of the insulation;

the sleeve makes it possible, through its open design to accept any type of DC motor, the only requirement regarding the motor being with respect to its size and to the presence of accessible electrical contactors;

the use of different materials and/or different Shore hardnesses from one pad/strand to another and/or between pads and strands, and the thickness and/or the shape of the pads/strands make it possible to target the ideal vibration absorption as closely as possible;

the overmolding of the polypropylene with a thermoplastic elastomer makes it possible to design a simple, rapid and robust manufacturing method;

the choice of materials is guided by the fact that they combine very well, which improves the transmission of vibrations from one material to the other.

It must, however, still be clearly understood that the detailed description, given solely by way of illustration of the subject of the invention, does not in any way constitute a limitation, technical equivalents also being included within the scope of the present invention.

Thus, the support may be used for an air circulation blower for a car seat, for an air extractor or for an auxiliary air-propulsion device for a heating, ventilation and/or air-conditioning unit, for example for vehicle rear seats.

As an embodiment variant, the sleeve may be equipped radially with three articulated and tapered leaves such as film hinges at the external wall of the sleeve and at the region of contact between the sleeve and the housing, so as to provide a certain torsional flexibility between the sleeve and the housing. The number of articulated leaves is preferably equal to 3, and they are angularly distributed 120° apart. The cross section of the leaves may be circular, rectangular, triangular, oval and may vary axially and/or radially.

The insulating pads 40 and/or the longitudinal strands 60 may, in addition, also be overmolded onto the sleeve.

The longitudinal strands 60 may also have individual regions of contact with the sleeve, for example they may be formed by a plurality of small aligned bosses each in point contact with said sleeve.

The number of pads and/or strands may also be greater than 3 for particular acoustic-absorption configurations or shapes of housing and/or of sleeve.

Thus, in the case where the center of gravity of the assembly consisting of the motor and of its bladed impeller is off-centered with respect to its axis of rotation, the solution of placing the pads and/or the strands respectively at 120° apart is no longer the ideal solution because the center of inertia of the equilateral triangle thus formed does not coincide with that of the assembly defined previously. In this case, the pads and/or the strands need to be arranged in a triangle that is not an equilateral triangle so as to cause the centers of gravity in question to coincide, and they therefore need to be placed angularly in a different geometric layout.

Likewise, the insulating pads 40 and the longitudinal strands 60 may be arranged respectively in different planes and/or on different circumferences.

Finally, it is also conceivable to choose different compression ratios for each of the insulating pads 40 and/or longitudinal strands 60 so as to permeate the non-uniform geometric distribution of the pads and/or of the strands on the same circumference and/or in the same plane.

Ideally, the insulating pads 40 and the longitudinal strands 60 should be located in such a way that the center of gravity of the assembly consisting of the motor and its bladed impeller is positioned as close as possible to the respective centers of inertia of said pads and said strands.

The invention claimed is

1. Support (10) for a motor (100), particularly for a motor vehicle heating, ventilation and/or air-conditioning unit blower, the support (10) comprising a hollow sleeve (20) for accepting the motor (100), a fixing housing (30) for accepting the hollow sleeve (20), first (50) and second (70) vibration-absorbing means disposed adjacent to the fixing housing (30), the second vibration-absorbing means (70) comprising at least one longitudinal strand (60) engaging an external wall (21) of the sleeve (20) with the at least one longitudinal strand (60) separated from the first vibration-absorbing means (50) and operating independently of the first vibration-absorbing means (50), and further comprising at least one connecting strand (82) wherein the at least one longitudinal strand (60) is cantilevered with the at least one connecting strand (82).

2. Support according to claim 1, wherein the sleeve (20) is equipped with at least one guide finger (24).

3. Support according to claim 2, wherein the first vibration-absorbing means (50) comprise at least one pad (40) collaborating with the guide finger (24).

4. Support according to claim 3, wherein the at least one pad (40) defines a central through-orifice (42) for receiving the guide finger (22) of the sleeve (20).

5. Support according to claim 3, wherein the at least one pad (40) measures between 4 to 10mm in axial height.

6. Support according claim 4, wherein the at least one pad (40) is in the shape of a cylinder and has a radial thickness of material of at least two mm around the orifice(42).

7. Support according to claim 3, wherein the at least one pad (40) is three in number.

8. Support according to claim 1, wherein the at least one longitudinal strand (60) is secured to an internal wall (33) of the fixing housing (30) and is in contact with the external wall (21) of the sleeve (20).

9. Support according to claim 1, wherein the at least one longitudinal strand (60) is three in number.

10. Support according to claim 1, wherein the at least one longitudinal strand (60) has an axial length of at least 20mm.

11. Support according to claim 1, wherein the at least one longitudinal strand (60) has a radial thickness of at least 1mm.

12. Support according to claim 3, wherein the at least one pad (40) is further defined as three pads (40) and the at least one longitudinal strand (60) is further defined as three longitudinal strands (60) and wherein the pads (40) and the longitudinal strands (60) alternate with and are angularly offset by about 60° with respect to one another.

13. Support according to claim 3, wherein the at least one pad (40) and/or the at least one longitudinal strand (60) are overmolded as a single piece onto the fixing housing (30).

14. Support according to claim 1, wherein the first (50) and second (70) vibration-absorbing means are formed from an elastically deformable material.

15. Support according to claim 14, wherein the elastically deformable material is made of a thermoplastic elastomer having a Shore hardness of between about 20 and 30.

16. Support according to claim 14, wherein the elastically deformable material is an elastomer.

17. Support according to claim 1, wherein the at least one connecting strand (82) connects the first vibration-absorbing means (50) to the second vibration-absorbing means (70).

18. Support according to claim 17, wherein a gap is formed between the at least one longitudinal strand (60) and the connecting strand (82).

19. Support (10) for a motor (100), particularly for a motor vehicle heating, ventilation and/or air-conditioning unit blower, the support (10) comprising
   a hollow sleeve (20) for accepting the motor (100),
   the hollow sleeve (20) equipped with three guide fingers (24),
   a fixing housing (30) for accepting the hollow sleeve (20),
   three longitudinal strands (60) disposed adjacent to the fixing housing (30) and engaging an external wall (21) of the sleeve (20) for absorbing vibrations, and
   three pads (40) engaging with the guide fingers (24) for absorbing vibrations,
   wherein the pads (40) and the longitudinal strands (60) alternate with and are angularly offset by about 60° with respect to one another.

20. Support according to claim 19, further comprising a connecting strand (82) connecting the longitudinal strands (60) to the pads (40).

\* \* \* \* \*